(12) United States Patent
Sedarat et al.

(10) Patent No.: US 10,855,558 B2
(45) Date of Patent: Dec. 1, 2020

(54) VEHICLE NETWORKING SYSTEM TESTING AND CHARACTERIZATION

(71) Applicant: Ethernovia Inc., San Jose, CA (US)

(72) Inventors: Hossein Sedarat, San Jose, CA (US); Ramin Shirani, Morgan Hill, CA (US); Roy T. Myers, Jr., Santa Clara, CA (US); Darren S. Engelkemier, Menlo Park, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

(21) Appl. No.: 16/292,197

(22) Filed: Mar. 4, 2019

(65) Prior Publication Data

US 2020/0287803 A1 Sep. 10, 2020

(51) Int. Cl.
 *H04L 12/24* (2006.01)
 *H04L 12/26* (2006.01)
 *H04L 29/06* (2006.01)
 *H04W 4/40* (2018.01)

(52) U.S. Cl.
 CPC .......... *H04L 41/5038* (2013.01); *H04L 43/50* (2013.01); *H04L 63/14* (2013.01); *H04W 4/40* (2018.02)

(58) Field of Classification Search
 CPC ..... H04L 41/5038; H04L 63/14; H04L 43/50; H04W 4/40
 See application file for complete search history.

(56) References Cited

U.S. PATENT DOCUMENTS

2018/0309655 A1* 10/2018 Joseph ................. H04L 43/045
2019/0349392 A1* 11/2019 Wetterwald .......... H04J 3/0667

\* cited by examiner

*Primary Examiner* — Jae Y Lee
(74) *Attorney, Agent, or Firm* — Schwegman Lundberg & Woessner, P.A.

(57) ABSTRACT

Disclosed are systems, methods, and non-transitory computer-readable media for testing and characterization of computing systems implemented in vehicles. A testing system causes packet injectors in a vehicle networking system to execute a testing mode in which the packet injectors transmit synchronized sequences of data packets within the vehicle networking system. The testing system gathers, from logging mechanisms located within the vehicle networking system, diagnostic data describing data packet transmissions in the vehicle computer network during the testing mode. The diagnostic data includes data identifying data packets detected by the logging mechanisms and timestamps indicating times at which the data packets were detected by the logging mechanisms. The testing system generates, based on the diagnostic data and an expected diagnostic data, a testing report describing performance of the vehicle networking system during the testing mode.

45 Claims, 6 Drawing Sheets

VEHICLE NETWORKING SYSTEM TESTING AND CHARACTERIZATION

TECHNICAL FIELD

An embodiment of the present subject matter relates generally to computing and networking systems implemented in vehicles and, more specifically, to testing and characterization of computer networking systems implemented in vehicles.

BACKGROUND

Modern vehicles include many computer managed features. For example, vehicles include computers that monitor and/or control engine emissions, tire pressure, throttle position, engine temperature, spark plugs, fuel injection, automatic transmission, anti-lock brakes, automated driving, etc. Vehicles also include computers that manage non-critical luxury functions, such as keyless entry, climate control, motorized seats and mirrors, entertainment systems (e.g., radio, compact disk player), cruise control, etc.

To provide these computer managed features, vehicles are equipped with multiple sensors that continuously gather data and provide the data to computers (e.g., Electronic Control Unit (ECU)) included in the vehicle which in turn provide control command for actuators. For example, a computer that manages the anti-lock brake system uses data gathered from sensors located on the tires that read wheel speed and control the brake system. As another example, a computer that manages the climate control system gathers data from temperature sensors. Computers that manage advanced functions, such as automated driving, gather data from multiple sensors located at various points on the vehicle to control steering wheel, brakes, warning systems, etc.

One technical issue faced when implementing computer managed features in vehicles is available bandwidth for transmitting data. Vehicles are equipped with limited networking ability (e.g., wiring) to transmit data between the various computers and sensors located within the vehicle. This limited bandwidth may cause system latency through various portions of the network. This becomes an important issue when providing mission critical features, such as automated driving, that rely on time-sensitive data to make real-time decisions. For example, an automated driving system uses real-time sensor data gathered from multiple sensors (e.g, camera, sonar, radar, lidar, etc.) to determine the current surroundings of the vehicle and guide the direction of the vehicle accordingly. Network latency results in the automated driving system functioning without the data needed to accurately determine the vehicles surrounding, which may lead to a collision.

Current systems address this issue with network features that prioritize data for mission critical functions. For example, the network features provide priority to data packets being used for mission critical features such as automated driving over data packets being used for non-critical functions such as the entertainment system. While these network features provide a solution, determining whether they are functioning properly or as desired is difficult. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
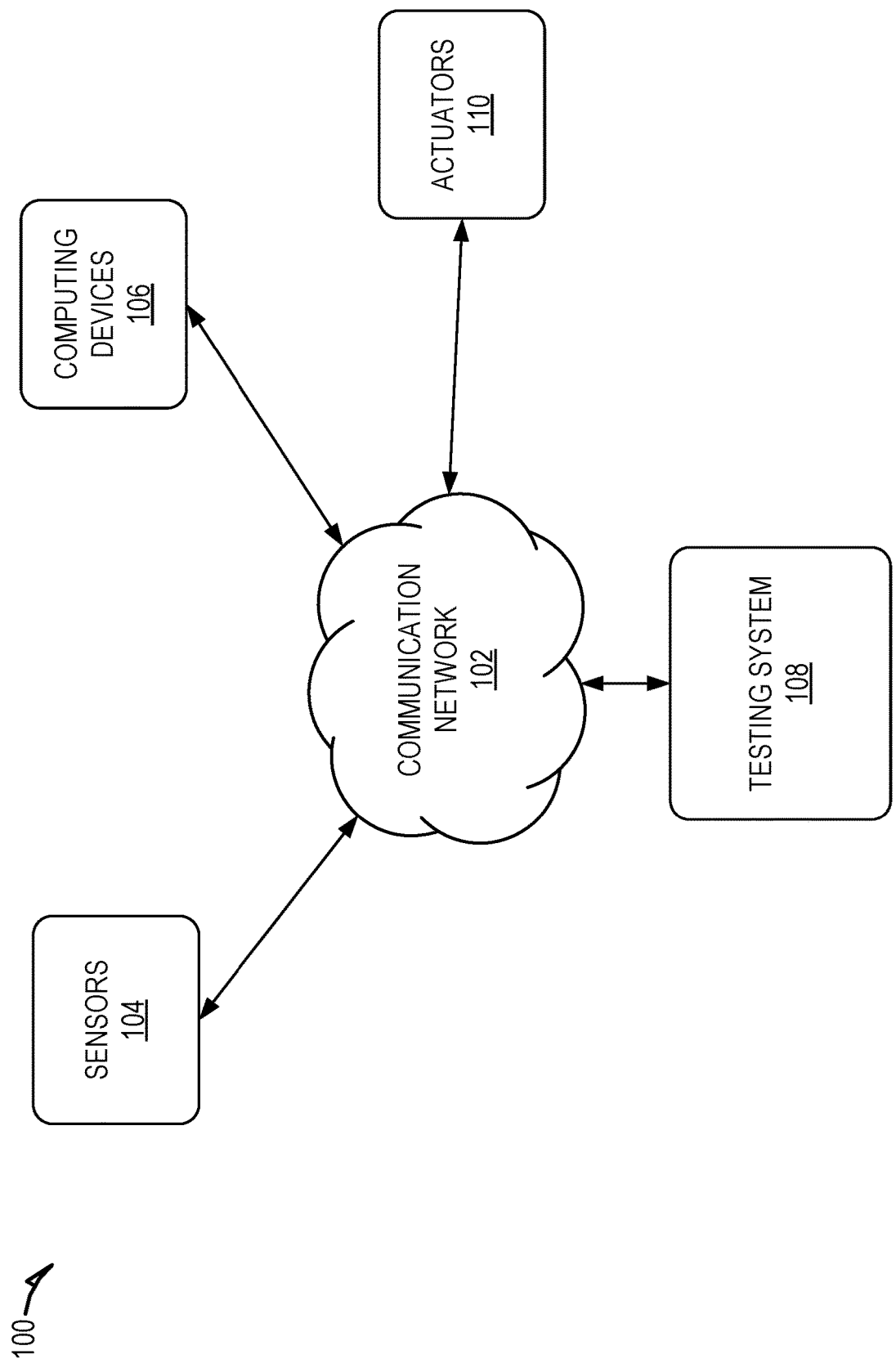
FIG. 1 shows a vehicle networking system, according to certain example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for testing and characterization of computing systems and networks implemented in vehicles (e.g., vehicle networking systems). Vehicle networking systems have limited available bandwidth because vehicles are equipped with limited wiring for transmitting data between computers, sensors, actuators, etc., located within the vehicle. Accordingly, a vehicle networking system is designed to prioritize transmission of certain types of data packets to ensure optimal performance of mission critical features. There are various functions in time-sensitive networking (TSN) standards (e.g. IEEE 802.1) that, if deployed and configured properly, can guarantee an upper limit in the latency of packet transmission in specific flows for pairs of source and destination nodes in an Ethernet network and provide the required quality of service (QoS) in an automotive network environment.

It is important to have a mechanism to monitor and log the flow of traffic within a vehicle networking system to characterize the nature of data traffic within the vehicle networking system which provides the information to identify the proper configuration of TSN and other networking functions for optimal network performance. It is also important to monitor the state of hardware and software elements of the vehicle networking system as data packets flow within the vehicle networking system. This provides valuable information in refining the configuration of network elements (e.g., nodes) for improved performance. It also provides the means to test the networking elements to ensure they behave as expected. This can be a very important mechanism to provide the high level of functional safety that is needed within vehicle computing networks. Some networking functions are stressed under certain traffic patterns while in a specific configuration state (e.g., specific configuration of hardware and software elements of the vehicle networking system) which may happen only under very rare scenarios. It is important to have the means to create those traffic patterns along with the proper state of networking elements in order to validate the proper operation of the key network functionalities. It is important to have programmable test traffic generators in the networking nodes. It is also important to have a mechanism to preset the state of some or all of the network elements in order to monitor the behavior of the elements under desired configuration states. Since the relative timing of data packets plays an important role in how the network elements behave, it is important to have the capability to synchronize the test traffic generators with each other and with the configuration state of the network elements.

The vehicle networking system includes a testing system that periodically tests the vehicle networking system to ensure that the included network features, such as network traffic prioritization, are performing as expected. For example, the testing system initiates a testing mode during which controlled network traffic is transmitted within the vehicle networking system to exercise and stress various critical network features. The features under test may be features related to quality of service (QoS) such as scheduling, policing, shaping. These features may also be other network functions such as packet encapsulation, editing, forwarding, filtering, etc. The testing system gathers diagnostic data describing data packet transmissions during the testing mode and analyzes the diagnostic data to determine whether the hardware and/or software in the vehicle networking system is performing as expected. For example, the testing system compares the diagnostic data to expected diagnostic data based on the controlled network traffic to determine whether the exercised network features performed as expected. In some embodiments, each element (e.g., hardware and/or software function) of the vehicle networking system is capable of logging key information about the data packet that traverse through the element, as well as information describing the state of the function at that time. The logged information may include the time of arrival of the data packet, the time of departure of the data packet, the size of the data packet, the header of the data packet, the encapsulation, etc. The state of the network function may be the depth of the queues, the credit or token of the traffic shapers, the state of the gates, etc.

The testing system includes preset mechanisms that configure the vehicle networking system into a predetermined configuration state for a testing mode and programmable packet injectors that can be instructed to transmit synchronized sequences of predetermined data packets during a testing mode. The packet injectors transmit data packets according to a programmable list. Each entry of this list provides key information about each test packet to be sent. The information may include the size of the packet, the destination for the packet, other header components of the packet, and any other fields of the packet, the time to send the packet (which may be an absolute time for the first entry but may be incremental time on the following entries), etc. Once the list is exhausted, the packet injector may be programmed to halt or repeat the list from the top after a programmable delay. Similarly, the functional elements of the network can have a list of preset configurations. Each entry of the list identifies which state should be set with what value and at what time. Again, once the list is exhausted, the element may be programmed to stop presetting its state or continue from the top of the list. The programmable packet injectors and the preset mechanisms operate according to internal clocks that are synchronized using a timing protocol, such as the Precision Timing Protocol (PTP) or its generalized version gPTP.

Each programmable packet injector receives a sequence of data packets to be transmitted by the respective packet injector, as well as times at which the data packets are to be transmitted. The programmable packet injectors transmit the data packets at the corresponding times based on the synchronized internal clocks, thereby creating the desired network traffic to test network features of the vehicle networking system.

The testing system further includes logging mechanisms that detect and log transmission of data packets within the vehicle networking system. For example, the logging mechanisms log relevant hardware and software information during the testing mode. The logged diagnostic data describes data packet transmissions through the vehicle networking system during the testing mode. For example, each logging mechanism logs data packets as they travel through the logging mechanism (e.g., packet arrival time, departure time, buffer backlog, credit, gate states, route, etc.). Note that each functional element of the network may include a logging mechanism so that the entire history of a packet from the source to destination is logged.

The testing system gathers the logged diagnostic data from the logging mechanisms and analyzes the diagnostic data to characterize performance of the vehicle networking system and determine whether the vehicle networking system is performing as desired. For example, the testing system may use the logged diagnostic data to determine the time and order in which data packets were received and transmitted by various nodes in the vehicle networking system and compare the determined time and order to an expected order in which the data packers were to be received and transmitted. The testing system may further generate a testing report describing the determined performance of the vehicle networking system.

FIG. 1 shows a vehicle networking system 100, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the vehicle networking system 100 to facilitate additional functionality that is not specifically described herein.

The vehicle networking system 100 is a collection of nodes distributed within a vehicle (e.g., automobile) and interconnected via a communication network 102 comprising communication links and segments for transporting data between end points, such as sensors 104, actuators, and computing devices 106. Each node in the vehicle networking system 100 may be a redistribution point or an endpoint that can receive, create, store or send data along distributed network routes. Each node, whether an endpoint or a redistribution point, has either a programmed or engineered capability to recognize, process and forward data transmissions to other nodes in the vehicle networking system 100. Examples of nodes include sensors 104, displays, actuators, computing devices 106, routers (not shown), switches (not shown), etc.

The communication network 102 is implemented using any number of nodes and communications links, including one or more wired communication links, one or more wireless communication links, or any combination thereof. Additionally, the communication network 102 is configured to support the transmission of data formatted using any number of protocols.

Multiple sensors 104, computing devices 106, and actuators 110 can be connected to the communication network 102. A computing device 106 is any type of general computing device capable of network communication with other computing devices. For example, a computing device 106 can include some or all of the features, components, and peripherals of the computing system 600 shown in FIG. 6.

To facilitate communication with other computing devices 106, a computing device 106 includes a communication interface configured to receive a communication, such as a request, data, and the like, from another computing device 106 or sensor 104 in network communication with the computing device 106 and pass the communication along to an appropriate module running on the computing device 106. The communication interface also sends a communication to another computing device 106 in network communication with the computing device 106.

The sensors 104 may be any type of sensors used to capture data. For example, the sensors 104 may include engine speed sensors, fuel temperature sensors, voltage sensors, pressure sensors, radar sensors, light detection and ranking (LIDAR) sensors, imaging sensors (e.g., camera, video camera), etc. The sensors 104 capture data describing performance of a vehicle and its surroundings and provide the captured data to one or more of the computing devices 106.

The computing devices 106 use the captured sensor data to provide various computer managed features. For example, the computing devices 106 may use the gathered sensor data to monitor and/or control engine emissions, tire pressure, throttle position, engine temperature, spark plugs, fuel injection, automatic transmission, anti-lock brakes, automated driving, etc. The computing devices 106 may also use the gathered sensor data to provide non-critical luxury functions, such as keyless entry, climate control, motorized seats and mirrors, entertainment system (e.g., radio, compact disk player), cruise control, etc.

The actuators 110 are hardware components that are responsible for executing an a mechanical/electrical action, such as moving and controlling a mechanism or system. Examples of actuators 110 include an on/off switch (e.g. door locks, lights, etc.), electric motors (e.g. side mirror, seat and steering wheel control), etc. The computing devices 106 transmit commands to the actuators to perform a specified action. This category of network devices also include any device that mostly consume data, such as video displays and audio speakers.

As previously explained, the communication network 102 may have limited available bandwidth for transmitting data. Accordingly, the vehicle networking system 100 is designed to ensure quality of service (QoS) for certain types of data packets to ensure optimal performance of mission critical features. For example, the various nodes included in the communication network 102 may provide priority to sensor data used for providing automated driving to ensure that the computing device 106 facilitating the automated driving function is concurrently receiving sensor data captured from each sensor at a given time.

As shown, the vehicle networking system 100 includes a testing system 108. The testing system 108 periodically tests the vehicle networking system 100 to ensure that the included network features, such as network traffic prioritization, are performing as expected. One critical component of testing system 108 is the capability to monitor and log diagnostic data about packet traffic along with the state of functional elements of the network as the packets traverse them. This diagnostic data may be gathered for all or some packets as they traverse through all of some of the functional elements of the network. The diagnostic data that the functional elements record may include: arrival and departure time of the packets, header and other critical components of the packet, the critical state of the functional element (such as the depth of queues, the credit or tokens of the traffic shapers, etc.) as the packet was processed by them. The diagnostic data may be forwarded through dedicated diagnostic and management ports to the testing system 108. Alternatively, the diagnostic data may be transmitted over a logical channel (e.g., Operation Administration and Maintenance (OAM)) over the main data port. The testing system 108 may continuously monitor the network for this diagnostic data. Alternatively, the testing system 108 may periodically command (e.g., through an OAM channel) the network nodes to log and send their diagnostic data. The testing system 108 may monitor the network as the network is operating normally with its typical data traffic. Alternatively, the testing system 108 may initiate (e.g., through a multicast request over an OAM channel) a special testing mode during which controlled network traffic is generated and transmitted within the vehicle networking system 100 to exercise and stress various critical network features. In this special testing mode, the testing system 108 may also send a request to preset some or all states of some or all function elements of the network. For instance, the testing system 108 may request to preset the credit of a certain credit-based traffic shaper. The request to generate the test traffic and preset the state of function elements may be carried over an OAM channel. The request can include the details of test packet generation and the state of elements across the network. The request may also carry time information so that the test packet generators may be synchronized with each other and/or with the time of preset of the function elements. The synchronization of the disjoint elements of the network may be achieved through a timing mechanism such as Precision Timing Protocol (PTP). The testing system 108 gathers diagnostic data describing data packet transmissions during the testing and monitoring modes. This information can be used to characterize the network traffic in different modes of operation of the vehicle. This characterization can help identify an optimized configuration of the network elements in each mode of operation of the vehicle. The gathered diagnostic data can also be analyzed to determine whether the hardware and/or software in the vehicle networking system 100 is performing as expected. For example, the testing system 108 compares the diagnostic data to expected values based on the controlled network traffic to determine whether the exercised network features performed as expected. This may provide additional means to guarantee a target functional safety of the network operation in the vehicle. Additionally, the diagnostic data may also be used to identify atypical traffic patterns which may indicate a malicious network intrusion, providing additional level of security for the automotive networking system.

While the testing system 108 is shown separately from the sensors 104, computing devices 106 and communication network 102, this is just for ease of explanation and is not meant to limiting. The testing system 108 may be incorporated throughout the vehicle networking system 100, meaning that the various components of the testing system 108 may be incorporated into any of the nodes of the vehicle networking system 100.

The testing system 108 includes preset mechanisms that configure the vehicle networking system into a predetermined configuration state for a testing mode and programmable packet injectors that can be instructed to transmit synchronized sequences of predetermined data packets during a testing mode. The programmable packet injectors operate according to internal clocks that are synchronized using a timing protocol, such as the Precision Timing Protocol (PTP). Each programmable packet injector receives a sequence of data packets to be transmitted by the respective packet injector, as well as times at which the data packets are to be transmitted. The programmable packet injectors transmit the data packets at the corresponding times based on the synchronized internal clocks, thereby creating the desired network traffic to test the vehicle networking system 100.

The testing system 108 further includes logging mechanisms that detect and log transmission of data packets within the vehicle networking system 100. For example, the logging mechanisms log relevant hardware information during the testing mode. The logged diagnostic data describes data packet transmissions through the vehicle networking system 100 during the testing mode. For example, each logging mechanism logs data packets as they travel through the logging mechanism (e.g., packet arrival time, departure time, buffer backlog, credit, gate states, etc.).

The testing system 108 gathers the logged diagnostic data from the logging mechanisms and analyzes the diagnostic data to characterize performance of the vehicle networking system 100 and determine whether the vehicle networking system 100 is performing as desired. For example, the testing system 108 may use the logged diagnostic data to determine an order in which data packets were received and transmitted by various nodes in the vehicle networking system 100 and compare the determined order to an expected order in which the data packers were to be received and transmitted. The testing system 108 may further generate a testing report describing the determined performance of the vehicle networking system.

Figure 2:
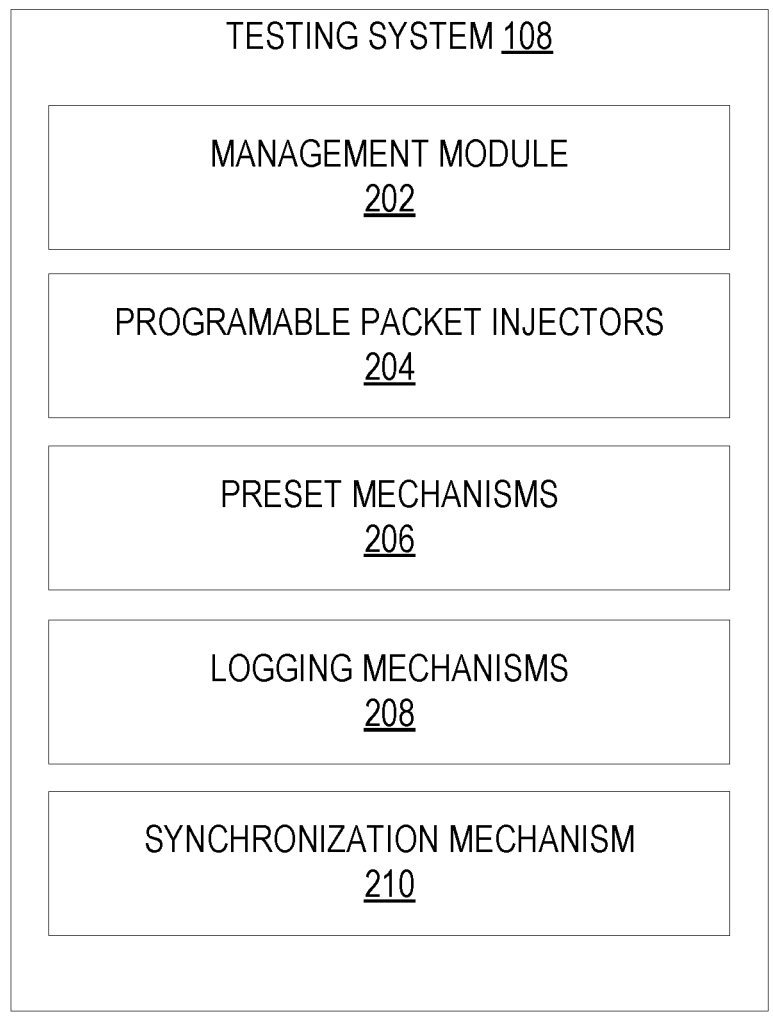
FIG. 2 is a block diagram of a testing system, according to certain example embodiments.

FIG. 2 is a block diagram of the testing system 108, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 2. However, a skilled artisan will readily recognize that various additional functional components may be supported by the testing system 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the testing system 108 includes a management module 202, programmable packet injectors 204, preset mechanisms 206, logging mechanisms 208, and a synchronization mechanism 210. The management module 202 manages the functionality of the testing system 108. For example, the management module 202 causes execution of testing modes in which various network features of the vehicle networking system 100 are exercised and stressed to ensure that the network features are performing as expected. During a testing mode, the management module 202 may cause the vehicle networking system 100 to be configured into a predetermined configuration state corresponding to the testing mode. Configuring the vehicle networking system 100 into a configuration state includes configuring the state of specified nodes in the vehicle networking system 100 to properly test one or more network functions of the vehicle networking system 100. For example, configuring the vehicle networking system 100 into a configuration state may include configuring specified hardware first in first outs (FIFOs), data buffers, etc.

The management module 202 configures the vehicle networking system 100 using preset mechanisms 206. The present mechanisms 206 are implemented within the vehicle networking system 100 and are configured to reconfigure the state of nodes in the vehicle networking system 100. The management module 202 transmits commands to one or more of the preset mechanisms 206 to configure the vehicle networking system 100. The commands include instructions on how each respective preset mechanism 206 should configure one or more nodes of the vehicle networking system 100 for a given testing mode. The functionality of the preset mechanisms 206 are described in greater detail below.

In addition to presetting the functional elements of the network in the vehicle networking system 100 into the appropriate configuration state for a testing mode, the management module 202 causes transmission of sequences of data packets within the vehicle networking system 100 to stress and exercise specified features of the vehicle networking system 100. For example, the management module 202 transmits commands to one or more of the programmable packet injectors 204 to initiate transmission of the sequence of data packets. The command may include data describing the sequence of data packets, such as the size of the individual data packets, header information (e.g., destination address, priority, etc.), payload data, etc., as well as data describing how the data packets are to be transmitted. For example, the command may include a time at which the programmable packet injectors 204 should initiate transmission of the sequence of data packets and data identifying the sequence in which the data packets are to be transmitted and/or the times at which individual data packets are to be transmitted.

The management module 202 may transmit the command to initiate the testing mode and data describing the sequence of data packets as a single message or as separate messages. Further, the management module 202 may transmit the data describing the sequence of data packets using a messaging protocol such as Operation Administration and Maintenance (OAM). For example, the data describing the sequence of data packets may be included in the payload of an OAM message. The functionality of the programmable data packet injectors is described in greater detail below.

In addition to causing execution of the testing modes, the management module 202 gathers diagnostic data describing behavior and performance of the vehicle networking system 100 during the testing mode. The diagnostic data describes how the data packet traversed through the functional elements of the network in the vehicle networking system 100 during the testing mode. The diagnostic data may also include information about the state of the functional elements as each packet was traversing through them. The management module 202 analyzes the diagnostic data to determine whether the tested traffic and networking elements are behaving as expected. For example, the management module 202 compares the diagnostic data to an expected data. The management module 202 further generates a testing report describing performance of the vehicle networking system 100 during the testing mode. The management module 202 may also transmit notifications indicating any detected issues with the tested network features of the vehicle networking system 100. The functionality of the management module 202 is described in greater detail below in references to FIG. 3.

The programmable packet injectors 204 transmit sequences of data packets during a testing mode. Each programmable packet injector 204 may be implement in a node in the vehicle networking system 100. That is, a programmable packet injector 204 may be implemented as part of any node in the network such a sensor node, a computing node, or switching (or bridging, routing) node, etc. The programmable packet injectors 204 receive commands from the management module 202 to execute a testing mode and execute the testing mode in accordance with data included in the command. For example, the programmable packet injectors 204 transmit a sequence of data packets described in a command received from the management module 202. As explained earlier, the commands include data describing the size, payload, header, transmission time, etc., for each data packet in the sequence of data packets. The programmable packet injectors 204 transmit the sequence of data packets according to the provided description in the command.

The preset mechanisms 206 configure the state of some or all functional elements of some or all networking nodes in the vehicle networking system 100. Each preset mechanism 206 may be implement as additional software or hardware features in some or all nodes (e.g., sensors, switches, etc.) in the vehicle networking system 100. The preset mechanisms 206 receive commands from the management module 202 to configure the vehicle networking system 100 into a configuration state for a testing mode. The command includes data identifying the nodes to be configured and any corresponding value. For example, the command may identify a buffer to be configured as well as token values for configuring the identified buffer. The command may also include data identifying a time at which a preset mechanism 206 is to perform the configuration. The present mechanisms 206 configure the functional elements of the network of the vehicle networking system 100 according to the provided description in the command.

During a testing mode, synchronization amongst the various programmable packet injectors 204 and preset mechanisms 206 is crucial to properly test a specified network feature of the vehicle networking system 100. To create the desired network traffic that causes the network feature to be triggered, configuration of the affected nodes of the vehicle networking system 100 and transmission of the sequences of data packets should be synchronized precisely. Accordingly, the programmable packet injectors 204 and preset mechanisms 206 support a time-based triggering mechanism that allows for synchronization. For example, the programmable packet injectors 204 and preset mechanisms 206 may include or have access to internal clocks that have been synchronized. For example, the internal clocks may be synchronized by the synchronization mechanism 210 using a timing protocol, such as the Precision Timing Protocol (PTP). Accordingly, the programmable packet injectors 204 and preset mechanisms 206 use the internal clocks available to them to ensure that configuration of the vehicle networking system 100 and transmission of the sequences of data packets are synchronized.

The logging mechanisms 208 record the diagnostic data captured during a testing mode. Each logging mechanisms 208 may be a standalone hardware or software feature in a networking node in the vehicle networking system 100. Each logging mechanism 208 logs relevant hardware information as a data packet travels through the respective logging mechanism 208. For example, the logging mechanisms 208 may log the packet arrival time, departure time, buffer backlog, credit, gate states, etc.

The synchronization mechanism 210 synchronizes multiple internal clocks in the vehicle networking system 100. Various hardware nodes in the vehicle networking system 100 may have access to their own internal clock. Accordingly, functions performed by the node may be synchronized using their respective internal clock. However, the internal clocks on the varying nodes may not be synchronized with each other. This may lead to issues when conducting a testing mode. Accordingly, the synchronization mechanism 210 synchronizes the internal clocks using a timing protocol, such as PTP or gPTP.

Figure 3:
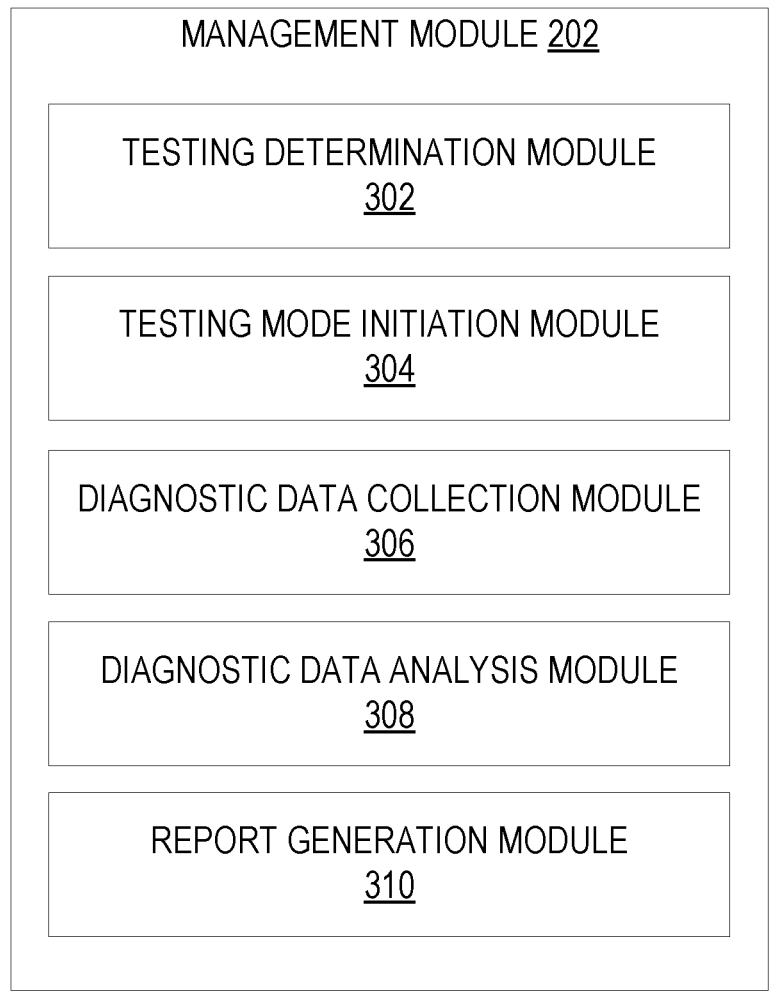
FIG. 3 is a block diagram of a management module, according to certain example embodiments.

FIG. 3 is a block diagram of the management module 202, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 3. However, a skilled artisan will readily recognize that various additional functional components may be supported by the management module 202 to facilitate additional functionality that is not specifically described herein. Furthermore, the various functional modules depicted in FIG. 3 may reside on a single computing device, node, switch, etc., or may be distributed across several computing devices, nodes, switches, etc., in various arrangements. For example, instances of the management module 202 may be implemented on multiple switches included in the vehicle networking system 100.

As shown, the management module 202 includes a testing determination module 302, a testing mode initiation module 304, an diagnostic data collection module 306, an diagnostic data analysis module 308, and a report generation module 310.

The testing determination module 302 determines when to initiate a testing mode in the vehicle networking system 100. The test may be non-intrusive and consists solely of collection of diagnostic data during normal data traffic. It may be intrusive and include additional test traffic for better characterization of the network. Execution of the intrusive testing mode may be preferable during periods of time when the vehicle is stationary, idle, or in low use. The testing determination module 302 monitors use to the vehicle to determine when the vehicle is in an appropriate state to execute a testing mode. For example, the testing determination module 302 receives data from one or more sensors 104 of the vehicle networking system 100 to determine the current state of the vehicle, such as whether the vehicle is idle, moving, etc.

The testing determination module 302 then determines whether the current state of the vehicle is an appropriate state in which a testing mode may be initiated. For example, the testing determination module 302 may have access to a listing of predetermined states in which a testing mode may be initiated. The listing mode may include varying states for different tests of the features of the vehicle networking system 100. Accordingly, a suitable state in which to execute a testing mode to test one feature of the vehicle networking system 100 may not be a suitable state in which to execute a testing mode to test another feature of the vehicle networking system 100.

The testing determination module 302 may further determine when to execute testing modes based on a predetermined timing schedule and/or prioritization of the various testing modes. That is, the testing determination module 302 may determine whether to execute a testing mode or which testing mode to execute based on a period of time that has elapsed since previous execution of the testing modes and/or relative importance of the feature to be tested. Accordingly, the testing determination module 302 may determine to execute a testing mode if both the vehicle is in a suitable state to execute the testing mode and at least a threshold period of time has elapsed since the testing mode was previously executed. Further, in situations in which the testing determination module 302 may have to select which testing mode to initiate, the testing determination module 302 may use the predetermined prioritization to select the testing mode that tests the feature that is determined to have greater importance. Accordingly, testing of mission critical features may be given higher priority than testing of other features.

In response to determining that a testing mode should be initiated, the testing determination module 302 notifies the testing mode initiation module 304 to execute the testing mode. The notification provided by the testing determination module 302 to the testing mode initiation module 304 may include data identifying the testing modes that should be executed. For example, the notification may include a unique identifier that identifies the testing modes to be executed.

The testing mode initiation module 304 initiates a testing mode in response to receiving a notification from the testing determination module 302. To initiate the testing mode, the testing mode initiation module 304 initially configures the vehicle networking system 100 for execution of the testing mode. For example, the testing module initiation module 304 identifies a configuration state in which to configure the nodes of the vehicle networking system 100 to execute the testing mode and communicates with the appropriate preset mechanisms 206 to configure the vehicle networking system 100 accordingly. For example, the configuration state may include specified configurations for the hardware first in first outs (FIFOs), data buffers, etc.

The testing initiation module 304 identifies the configuration state in which to configure the vehicle networking system 100 for a given testing mode based on a predetermined listing of configuration states that correspond to the various testing modes. For example, the predetermined listing of configuration states may list the unique identifiers associated with the various testing modes along with the configuration state corresponding to the testing mode. The configuration states listed in the predetermined listing of configuration states may include data identifying the preset mechanisms 206 that the testing module initiation module 304 should communicate with to configure the vehicle networking system 100 into the appropriate configuration state, as well as data describing the configuration state, such as the nodes to be configured and any values used to configure the nodes. Additionally, the predetermined listing of configuration states may include command messages to be transmitted to configure the vehicle networking system 100 into the configuration state. Accordingly, the testing module initiation module 304 uses the data included in the predetermined listing of configuration states to generate and transmit commands to the preset mechanisms 206 or causes transmission of the commands included in the predetermined listing of configuration states.

The testing mode initiation module 304 also identifies the programmable packet injectors 204 to use to initiate the testing mode as well as the sequences of data packets to be transmitted by each of the identified programmable packet injectors 204. For example, the testing mode initiation module 304 uses a listing of data packet sequences that correspond to the various testing modes. For example, the predetermined listing of data packet sequences may list the unique identifiers associated with the various testing modes along with the data packet sequences corresponding to the testing mode. The data packet sequences listed in the predetermined listing of data packet sequences may include data identifying the programmable packet injectors 204 that the testing module initiation module 304 should communicate with to initiate the testing mode, as well as data describing the data packet sequences that should be transmitted by each identified programmable packet injector during the testing mode. Additionally, the predetermined listing of data packet sequences may include command messages to be transmitted to the programmable data packet injectors 204 to initiate the testing mode. Accordingly, the testing module initiation module 304 uses the data included in the predetermined listing of data packet sequences to generate and transmit commands to the programmable packet injectors 204 or causes transmission of the commands included in the predetermined listing of data packet sequences.

In some embodiments, the testing mode initiation module 304 determines times at which the preset mechanisms 206 are to configure the vehicle networking system 100 and the data packet injectors 204 are to initiate the testing mode (e.g., begin transmission of the sequence of data packets). The testing mode initiation module 304 includes the determined times in the commands sent to the preset mechanisms 206 and the data packet injectors 204. As explained earlier, the preset mechanisms 206 and the data packet injectors 204 may have access to internal clocks that are synchronized using a timing protocol. Accordingly, the preset mechanisms 206 and the data packet injectors 204 use the times included in the commands along with the internal clocks to synchronize configuration of the vehicle networking system 100 and execution of the testing mode.

The output collection module 306 gathers diagnostic data captured by the logging mechanisms 206 during the testing mode. The diagnostic data describes transmission of data packets, such as packet arrival times, packet departure times, components of packet header, buffer backlog, credit, gate states, etc.

The diagnostic data analysis module 308 analyzes the diagnostic data to determine whether the tested network functions are performing as expected. For example, the diagnostic data analysis module 308 may use the timestamp value (e.g., packet arrival and/or departure times) to determine and characterize performance of the vehicle networking system 100 during the testing mode, such as determining an order in which the sequence of data packets was transmitted and/or received by the various nodes of the vehicle networking system 100. The diagnostic data analysis module 308 may compare this determined sequence to an expected sequence based on the testing mode. The diagnostic data analysis module 308 identifies discrepancies between the detected order in which data packets were received and the expected order in which the data packets were expected to be received to determine whether the tested network feature is performing as desired or expected.

The report generation module 310 generates a testing report based on the analysis of the diagnostic data analysis module 308. The testing report may include data describing the performance of the tested feature (e.g., whether the tested feature performed as expected) as well as the underlying diagnostic data used during the analysis. For example, the testing report may include data characterizing performance of the vehicle networking system 100 during the testing mode. The testing report may further include data indicating discrepancies between the determined performance and an expected performance of the vehicle networking system 100. In instances in which a tested network feature is determined to be faulty, the report generation module 310 may transmit or cause presentation of a warning notification indicating that the network feature is not performing as expected.

Figure 4:
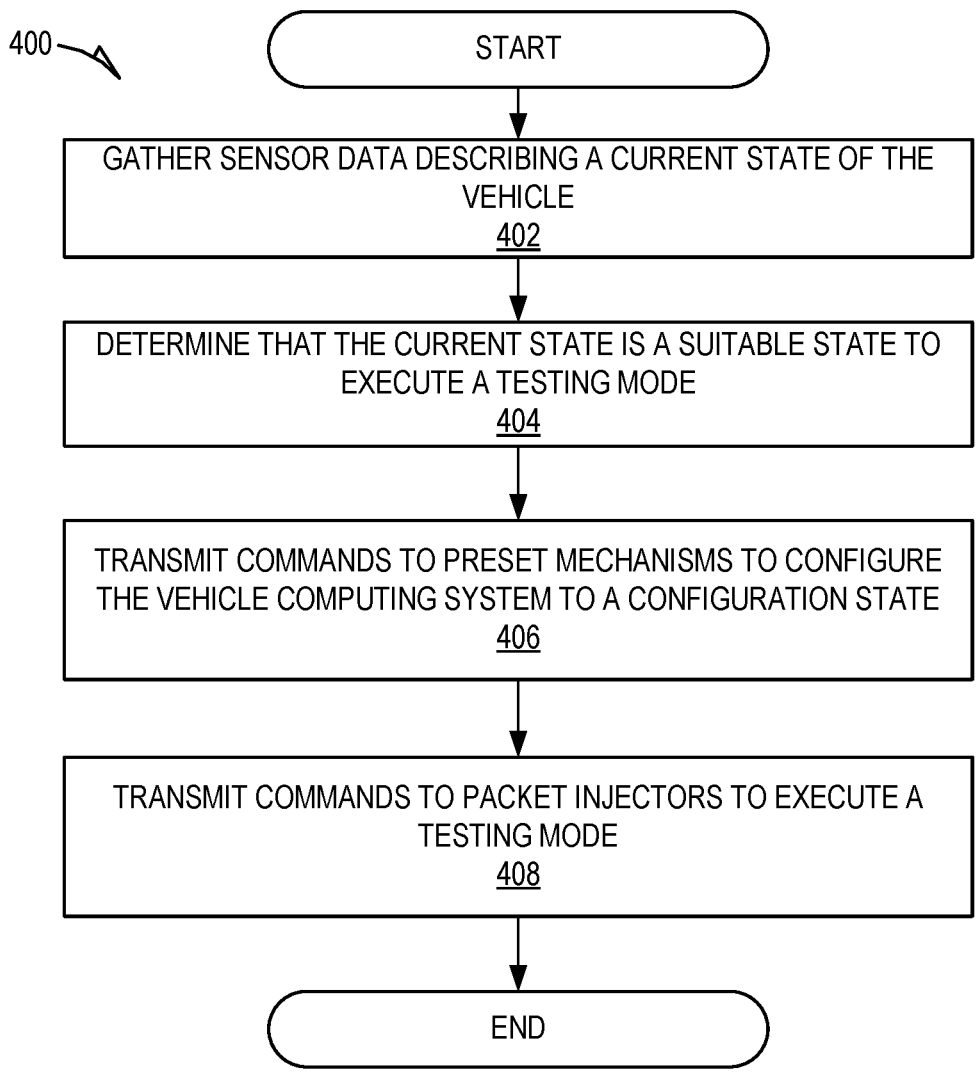
FIG. 4 is a flowchart showing a method of initiating a testing mode in a vehicle networking system, according to certain example embodiments.

FIG. 4 is a flowchart showing a method 400 of initiating a testing mode in a vehicle networking system 100, according to certain example embodiments. The method 400 may be embodied in computer readable instructions for execution by one or more processors such that the operations of the method 400 may be performed in part or in whole by the testing system 108; accordingly, the method 400 is described below by way of example with reference thereto. However, it shall be appreciated that at least some of the operations of the method 400 may be deployed on various other hardware configurations and the method 400 is not intended to be limited to the testing system 108.

At operation 402, the testing determination module 302 gathers sensor data describing a current state of the vehicle. The testing determination module 302 determines when to initiate a testing mode in the vehicle networking system 100. Execution of the testing mode may be preferable during periods of time when the vehicle is stationary, idle, or in low use. The testing determination module 302 monitors use to the vehicle to determine when the vehicle is in an appropriate state to execute a testing mode. For example, the testing determination module 302 receives data from one or more sensors 104 of the vehicle networking system 100 to determine the current state of the vehicle, such as whether the vehicle is idle, moving, etc.

At operation 404, the testing determination module 302 determines that the current state is a suitable state to execute a testing mode. For example, the testing determination module 302 may have access to a listing of predetermined states in which a testing mode may be initiated.

At operation 406, the testing mode initiation module 304 transmits commands to present mechanisms 206 to configure the vehicle networking system 100 to a configuration state. To initiate the testing mode, the testing mode initiation module 304 initially configures the vehicle networking system 100 for execution of the testing mode. For example, the testing module initiation module 304 identifies a configuration state in which to configure the nodes of the vehicle networking system 100 to execute the testing mode and communicates with the appropriate preset mechanisms 206 to configure the vehicle networking system 100 accordingly. For example, the configuration state may include specified configurations for the hardware first in first outs (FIFOs), data buffers, etc.

The testing module initiation module 304 identifies the configuration state in which to configure the vehicle networking system 100 for a given testing mode based on a predetermined listing of configuration states that correspond to the various testing modes. For example, the predetermined listing of configuration states may list the unique identifiers associated with the various testing modes along with the configuration state corresponding to the testing mode. The configuration states listed in the predetermined listing of configuration states may include data identifying the preset mechanisms 206 that the testing module initiation module 304 should communicate with to configure the vehicle networking system 100 into the appropriate configuration state, as well as data describing the configuration state, such as the nodes to be configured and any values used to configure the nodes. Additionally, the predetermined listing of configuration states may include command messages to be transmitted to configure the vehicle networking system 100 into the configuration state. Accordingly, the testing module initiation module 304 uses the data included in the predetermined listing of configuration states to generate and transmit commands to the preset mechanisms 206 or causes transmission of the commands included in the predetermined listing of configuration states.

At operation 408, the testing mode initiation module 304 transmits commands to packet injectors 204 to execute a testing mode. The testing mode initiation module 304 identifies the programmable packet injectors 204 to use to initiate the testing mode as well as the sequences of data packets to be transmitted by each of the identified programmable packet injectors 204. For example, the testing mode initiation module 304 uses a listing of data packet sequences that correspond to the various testing modes. For example, the predetermined listing of data packet sequences may list the unique identifiers associated with the various testing modes along with the data packet sequences corresponding to the testing mode. The data packet sequences listed in the predetermined listing of data packet sequences may include data identifying the programmable packet injectors 204 that the testing module initiation module 304 should communicate with to initiate the testing mode, as well as data describing the data packet sequences that should be transmitted by each identified programmable packet injector during the testing mode. Additionally, the predetermined listing of data packet sequences may include command messages to be transmitted to the programmable data packet injectors 204 to initiate the testing mode. Accordingly, the testing module initiation module 304 uses the data included in the predetermined listing of data packet sequences to generate and transmit commands to the programmable packet injectors 204 or causes transmission of the commands included in the predetermined listing of data packet sequences.

In some embodiments, the testing mode initiation module 304 determines times at which the preset mechanisms 206 are to configure the vehicle networking system 100 and the data packet injectors 204 are to initiate the testing mode (e.g., begin transmission of the sequence of data packets). The testing mode initiation module 304 includes the determined times in the commands sent to the preset mechanisms 206 and the data packet injectors 204. As explained earlier, the preset mechanisms 206 and the data packet injectors 204 may include of have access to internal clocks that are synchronized using a timing protocol. Accordingly, the preset mechanisms 206 and the data packet injectors 204 use the times included in the commands along with the internal clocks to synchronize configuration of the vehicle networking system 100 and execution of the testing mode.

Figure 5:
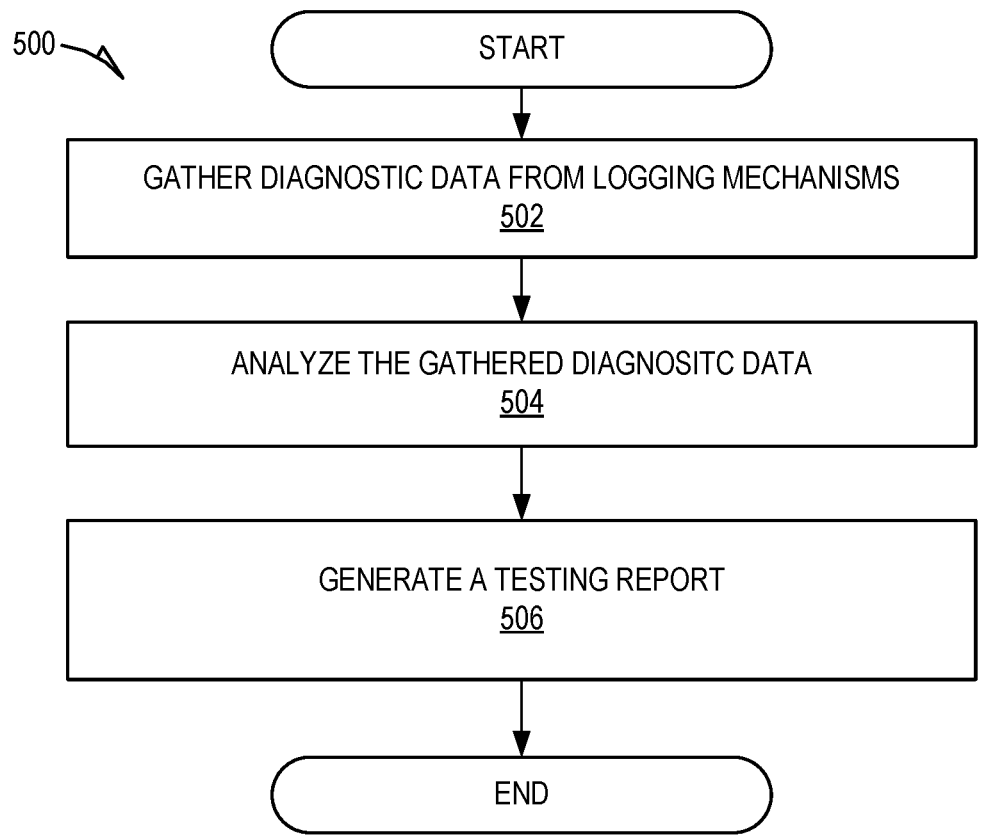
FIG. 5 is a flowchart showing a method of analyzing diagnostic data of a testing mode in a vehicle networking system, according to certain example embodiments.

FIG. 5 is a flowchart showing a method 500 of analyzing diagnostic data of a testing mode in a vehicle networking system 100, according to certain example embodiments. The method 500 may be embodied in computer readable instructions for execution by one or more processors such that the operations of the method 500 may be performed in part or in whole by the testing system 108; accordingly, the method 500 is described below by way of example with reference thereto. However, it shall be appreciated that at least some of the operations of the method 500 may be deployed on various other hardware configurations and the method 500 is not intended to be limited to the testing system 108.

At operation 502, the diagnostic data collection module 306 gathers diagnostic data from logging mechanisms 208. The output collection module 306 gathers diagnostic data captured by the logging mechanisms 206 during the testing mode. The diagnostic data describes transmission of data packets, such as packet arrival times, packet departure times, packet payloads, buffer backlog, credit, gate states, etc.

At operation 504, the diagnostic data analysis module 308 analyzes the gathered diagnostic data. The diagnostic data analysis module 308 analyzes the diagnostic data to determine whether the tested network functions are performing as expected. For example, the diagnostic data analysis module 308 may use the timestamp value (e.g., packet arrival and/or departure times) to determine and characterize performance of the vehicle networking system 100 during the testing mode, such as determining an order in which the sequence of data packets was transmitted and/or received by the various nodes of the vehicle networking system 100. The diagnostic data analysis module 308 may compare this determined sequence to an expected sequence based on the testing mode. The diagnostic data analysis module 308 identifies discrepancies between the detected order in which data packets were received and the expected order in which the data packets were expected to be received to determine whether the tested network feature is performing as desired or expected.

At operation 506, the report generation module 310 generated a testing report. The testing report may include data describing the performance of the tested feature (e.g., whether the tested feature performed as expected) as well as the underlying diagnostic data used during the analysis. For example, the testing report may include data characterizing performance of the vehicle networking system 100 during the testing mode. The testing report may further include data indicating discrepancies between the determined performance and an expected performance of the vehicle networking system 100. In instances in which a tested network feature is determined to be faulty, the report generation module 310 may transmit or cause presentation of a warning notification indicating that the network feature is not performing as expected.

Note that the methods described above for diagnostic logging and network testing and characterization may be done in a hierarchical fashion. It is possible and may be advantageous in certain conditions that each node or a group of nodes of a network execute their own test (using the methods described above) and log their diagnostic information (using the schemes described above) to characterize and validate the network traffic and the behavior of functional elements of the network within that node or group of network nodes. The test information may be elevated up to a bigger subset of the network nodes and subnetworks for expanded test coverage and broader network characterization, which among other things, would include an additional test coverage of the connectivity between the nodes and subnetworks. This hierarchy can extend up until it covers the entire network within a vehicle. The mechanisms explained in this document are not limited to network within a vehicle. The same hierarchical approach may also extend the coverage beyond the network within a vehicle and covers vehicle-to-vehicle (V2V) and vehicle-to-infrastructure (V2X) networks and vehicle-to-cloud as well.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 6:
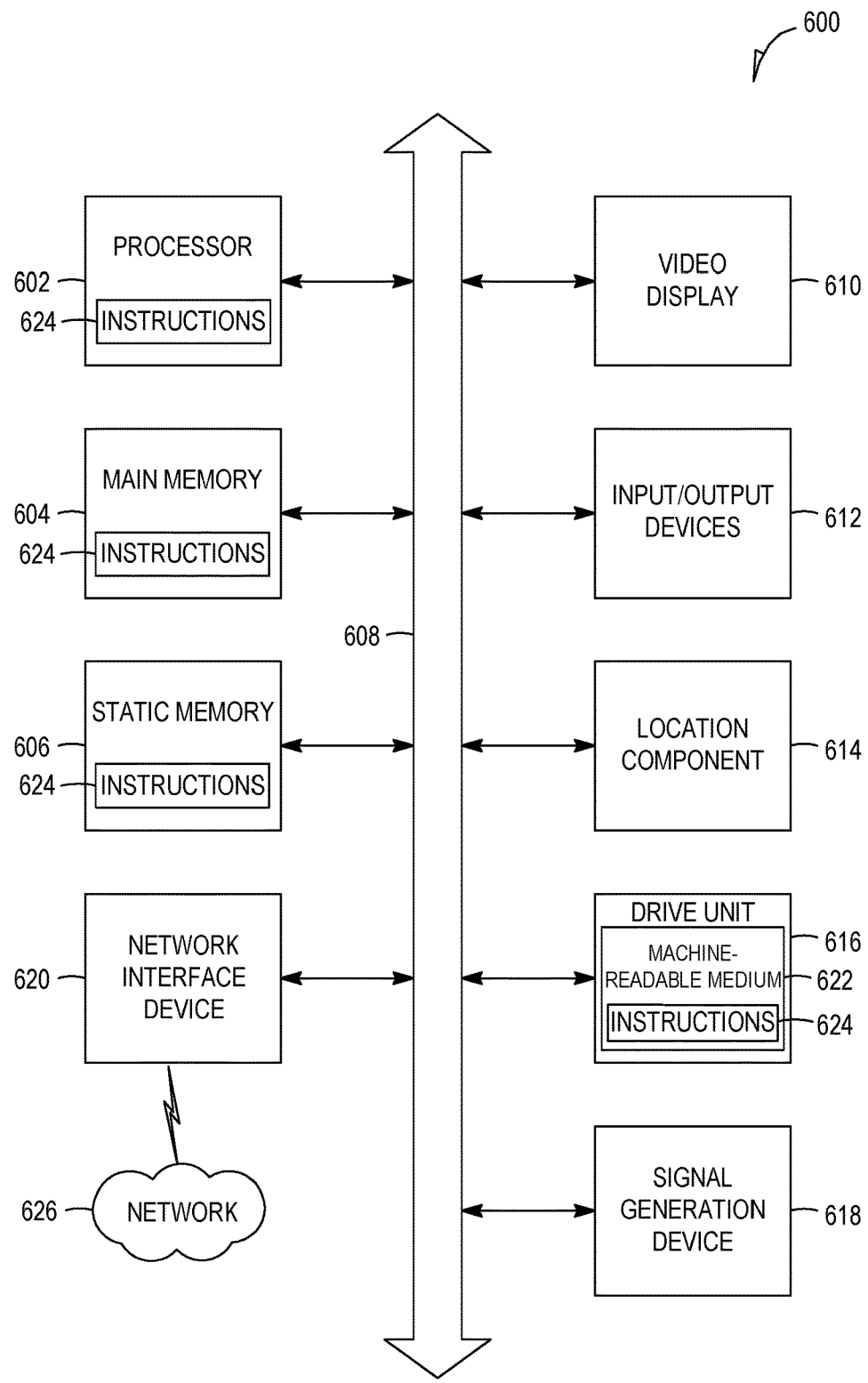
FIG. 6 is a diagrammatic representation of a machine in the example form of a computer system within which a set of instructions for causing the machine to perform any one or more of the methodologies discussed herein may be executed.

FIG. 6 is a diagrammatic representation of a machine in the example form of a computer system 600 within which a set of instructions for causing the machine to perform any one or more of the methodologies discussed herein may be executed. The computer system 600 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine may, for example, be a personal computer (PC), a PDA, a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 may further include a video display 610 (e.g., a liquid crystal display (LCD) or a cathode ray tube (CRT)). The computer system 600 also includes one or more input/output (I/O) devices 612, a location component 614, a drive unit 616, a signal generation device 618 (e.g., a speaker), and a network interface device 620. The I/O devices 612 may, for example, include a keyboard, a mouse, a keypad, a multi-touch surface (e.g., a touchscreen or track pad), a microphone, a camera, and the like.

The location component 614 may be used for determining a location of the computer system 600. In some embodiments, the location component 614 may correspond to a GPS transceiver that may make use of the network interface device 620 to communicate GPS signals with a GPS satellite. The location component 614 may also be configured to determine a location of the computer system 600 by using an internet protocol (IP) address lookup or by triangulating a position based on nearby mobile communications towers. The location component 614 may be further configured to store a user-defined location in main memory 604 or static memory 606. In some embodiments, a mobile location enabled application may work in conjunction with the location component 614 and the network interface device 620 to transmit the location of the computer system 600 to an application server or third-party server for the purpose of identifying the location of a user operating the computer system 600.

In some embodiments, the network interface device 620 may correspond to a transceiver and antenna. The transceiver may be configured to both transmit and receive cellular network signals, wireless data signals, or other types of signals via the antenna, depending on the nature of the computer system 600.

Machine-Readable Medium

The drive unit 616 includes a machine-readable medium 622 on which is stored one or more sets of data structures and instructions 624 (e.g., software) embodying or used by any one or more of the methodologies or functions described herein. The instructions 624 may also reside, completely or at least partially, within the main memory 604, the static memory 606, and/or the processor 602 during execution thereof by the computer system 600, with the main memory 604, the static memory 606, and the processor 602 also constituting machine-readable media.

Consistent with some embodiments, the instructions 624 may relate to the operations of an operating system (OS). Depending on the particular type of the computer system 600, the OS may, for example, be the iOS® operating system, the Android® operating system, a BlackBerry® operating system, the Microsoft® Windows® Phone operating system, Symbian® OS, or webOS®. Further, the instructions 624 may relate to operations performed by applications (commonly known as "apps"), consistent with some embodiments. One example of such an application is a mobile browser application that displays content, such as a web page or a user interface using a browser.

While the machine-readable medium 622 is shown in an example embodiment to be a single medium, the term "machine-readable medium" may include a single medium or multiple media (e.g., a centralized or distributed database, and/or associated caches and servers) that store the one or more data structures or instructions 624. The term "machine-readable medium" shall also be taken to include any tangible medium that is capable of storing, encoding, or carrying instructions (e.g., instructions 624) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 624 may further be transmitted or received over a network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 624 for execution by the machine, and includes digital or analog communications signals or other intangible media to facilitate communication of such software.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls. In this document, the terms "a" or "an" are used, as is common in patent documents, to include one or more than one, independent of any other instances or usages of "at least one" or "one or more." In this document, the term "or"

is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
    determining, based on sensor data describing a current state of a vehicle, to execute a testing mode of a vehicle networking system of the vehicle, the vehicle networking system including a set of preset mechanisms, a set of packet injectors, and a set of logging mechanisms;
    in response to determining to execute the testing mode of the vehicle networking system:
        causing the set preset mechanisms to configure a set of nodes of the vehicle networking system into specified states to achieve a first configuration state of the vehicle networking system; and
        while the vehicle networking system is in the first configuration state, causing the set of packet injectors to transmit synchronized sequences of data packets within the vehicle networking system;
    gathering, from the set of logging mechanisms located within the vehicle networking system, diagnostic data describing data packet transmissions in the vehicle networking resulting from transmission of the synchronized sequences of data packets by the set of packet injectors, the diagnostic data generated by the set of logging mechanisms as data packets traverse through each logging mechanism from the set of logging mechanisms, the diagnostic data including data identifying data packets detected by each logging mechanism and timestamps indicating times at which the data packets were detected by each logging mechanism; and
    generating, based on the diagnostic data and an expected diagnostic data, a testing report describing performance of the vehicle networking system during the testing mode.

2. The method of claim 1, further comprising:
    transmitting, to a first packet injector, data describing a first sequence of data packets to be transmitted by the first packet injector during the testing mode; and
    transmitting, to a second packet injector, data describing a second sequence of data packets to be transmitted by the second packet injector during the testing mode.

3. The method of claim 2, wherein the first sequence of data packets is different than the second sequence of data packets.

4. The method of claim 2, wherein the data describing the first sequence of data packets is included in a payload of an Operation Administration and Maintenance (OAM) message.

5. The method of claim 1, further comprising:
    transmitting, to a first packet injector, a command to execute the testing mode, the command including data identifying an execution time at which the first packet injector is to begin executing the testing mode, wherein the first packet injector determines a current time based on an internal clock that is synchronized using a timing protocol.

6. The method of claim 1, wherein generating the testing report comprises:
    determining, based on the diagnostic data, a monitored performance of the vehicle networking system during the testing mode;
    comparing the monitored performance of the vehicle networking system during the testing mode to an expected performance of the vehicle networking system during the testing mode, yielding a comparison; and
    determining, based on the comparison, a variance between the monitored performance and the expected performance, the testing report including data describing the variance.

7. The method of claim 1, further comprising:
    after completion of the testing mode, causing the set of packet injectors to execute a subsequent testing mode in which a first packet injector and a second packet injector transmit a second synchronized sequence of data packets within the vehicle networking system, the second synchronized sequence of data packets being different than the synchronized sequence of data packets.

8. The method of claim 1, wherein the diagnostic data is gathered through an OAM channel or through a designated data port.

9. The method of claim 1, further comprising:
    synchronizing, using a timing a protocol, a first internal clock available to a first packet injector in the set of packet injectors and a second internal clock available to a second packet injector in the set of packet injectors.

10. The method of claim 1, further comprising:
    determining, based on the testing report, a characterization of the vehicle networking system; and
    determining an optimization of the vehicle networking system based on the characterization.

11. The method of claim 1, further comprising:
    determining, based on the testing report, that a network function of the vehicle networking system that was tested by the testing mode is not performing as expected.

12. The method of claim 1, further comprising:
    determining, based on the testing report, that there has been a malicious network intrusion of the vehicle networking system.

13. The method of claim 1, further comprising:
    determining, based on the testing report, whether a desired Quality of Service level is being met.

14. The method of claim 1, wherein the testing mode is performed in a hierarchical fashion on subsets of nodes in the vehicle networking system.

15. The method of claim 14, wherein the hierarchical fashion in which the testing mode is performed extends from the vehicle networking system to a vehicle-to-vehicle networking system, vehicle-to-infrastructure networking system or vehicle-to-cloud networking system.

16. A system comprising:
    one or more computer processors; and
    one or more computer-readable mediums storing instructions that, when executed by the one or more computer processors, cause the system to perform operations comprising:
        determining, based on sensor data describing a current state of a vehicle, to execute a testing mode of a vehicle networking system of the vehicle, the vehicle networking system including a set of preset mechanisms, a set of packet injectors, and a set of logging mechanisms;
        in response to determining to execute the testing mode of the vehicle networking system:

causing the set preset mechanisms to configure a set of nodes of the vehicle networking system into specified states to achieve a first configuration state of the vehicle networking system; and while the vehicle networking system is in the first configuration state, causing the set of packet injectors first packet injector to transmit synchronized sequences of data packets within the vehicle networking system;

gathering, from the set of logging mechanisms located within the vehicle networking system, diagnostic data describing data packet transmissions in the vehicle networking resulting from transmission of the synchronized sequences of data packets by the set of packet injectors, the diagnostic data generated by the set of logging mechanisms as data packets traverse through each logging mechanism from the set of logging mechanisms, the diagnostic data including data identifying data packets detected by each logging mechanism and timestamps indicating times at which the data packets were detected by each logging mechanism; and generating, based on the diagnostic data and an expected diagnostic data, a testing report describing performance of the vehicle networking system during the testing mode.

17. The system of claim 16, the operations further comprising:

transmitting, to a first packet injector, data describing a first sequence of data packets to be transmitted by the first packet injector during the testing mode; and transmitting, to a second packet injector, data describing a second sequence of data packets to be transmitted by the second packet injector during the testing mode.

18. The system of claim 17, wherein the first sequence of data packets is different than the second sequence of data packets.

19. The system of claim 17, wherein the data describing the first sequence of data packets is included in a payload of an Operation Administration and Maintenance (OAM) message.

20. The system of claim 16, the operations further comprising:

transmitting, to a first packet injector, a command to execute the testing mode, the command including data identifying an execution time at which the first packet injector is to begin executing the testing mode, wherein the first packet injector determines a current time based on an internal clock that is synchronized using a timing protocol.

21. The system of claim 16, wherein generating the testing report comprises:

determining, based on the diagnostic data, a monitored performance of the vehicle networking system during the testing mode;

comparing the monitored performance of the vehicle networking system during the testing mode to an expected performance of the vehicle networking system during the testing mode, yielding a comparison; and determining, based on the comparison, a variance between the monitored performance and the expected performance, the testing report including data describing the variance.

22. The system of claim 16, the operations further comprising:

after completion of the testing mode, causing the set of packet injectors to execute a subsequent testing mode in which a first packet injector and a second packet injector transmit a second synchronized sequence of data packets within the vehicle networking system, the second synchronized sequence of data packets being different than the synchronized sequence of data packets.

23. The system of claim 16, wherein the diagnostic data is gathered through an OAM channel or through a designated data port.

24. The system of claim 16, the operations further comprising:

synchronizing, using a timing a protocol, a first internal clock available to a first packet injector in the set of packet injectors and a second internal clock available to a second packet injector in the set of packet injectors.

25. The system of claim 16, the operations further comprising:

determining, based on the testing report, a characterization of the vehicle networking system; and determining an optimization of the vehicle networking system based on the characterization.

26. The system of claim 16, the operations further comprising:

determining, based on the testing report, that a network function of the vehicle networking system that was tested by the testing mode is not performing as expected.

27. The system of claim 16, the operations further comprising:

determining, based on the testing report, that there has been a malicious network intrusion of the vehicle networking system.

28. The system of claim 16, the operations further comprising:

determining, based on the testing report, whether a desired Quality of Service level is being met.

29. The system of claim 16, wherein the testing mode is performed in a hierarchical fashion on subsets of nodes in the vehicle networking system.

30. The system of claim 29, wherein the hierarchical fashion in which the testing mode is performed extends from the vehicle networking system to a vehicle-to-vehicle networking system, vehicle-to-infrastructure networking system or vehicle-to-cloud networking system.

31. A non-transitory computer-readable medium storing instructions that, when executed by one or more computer processors of a computing system, cause the computing system to perform operations comprising:

determining, based on sensor data describing a current state of a vehicle, to execute a testing mode of a vehicle networking system of the vehicle, the vehicle networking system including a set of preset mechanisms, a set of packet injectors, and a set of logging mechanisms;

in response to determining to execute the testing mode of the vehicle networking system:

causing the set preset mechanisms to configure a set of nodes of the vehicle networking system into specified states to achieve a first configuration state of the vehicle networking system; and while the vehicle networking system is in the first configuration state, causing the set of packet injectors to transmit synchronized sequences of data packets within the vehicle networking system;

gathering, from the set of logging mechanisms located within the vehicle networking system, diagnostic data describing data packet transmissions in the vehicle networking resulting from transmission of the synchronized sequences of data packets by the set of packet injectors, the diagnostic data generated by the set of logging mechanisms as data packets traverse through each logging mechanism from the set of logging mechanisms, the diagnostic data including data identifying data packets detected by each logging mechanism and timestamps indicating times at which the data packets were detected by each logging mechanism; and generating, based on the diagnostic data and an expected diagnostic data, a testing report describing performance of the vehicle networking system during the testing mode.

32. The non-transitory computer-readable medium of claim 31, the operations further comprising:
transmitting, to a first packet injector, data describing a first sequence of data packets to be transmitted by the first packet injector during the testing mode; and
transmitting, to a second packet injector, data describing a second sequence of data packets to be transmitted by the second packet injector during the testing mode.

33. The non-transitory computer-readable medium of claim 32, wherein the first sequence of data packets is different than the second sequence of data packets.

34. The non-transitory computer-readable medium of claim 32, wherein the data describing the first sequence of data packets is included in a payload of an Operation Administration and Maintenance (OAM) message.

35. The non-transitory computer-readable medium of claim 31, the operations further comprising:
transmitting, to a first packet injector, a command to execute the testing mode, the command including data identifying an execution time at which the first packet injector is to begin executing the testing mode, wherein the first packet injector determines a current time based on an internal clock that is synchronized using a timing protocol.

36. The non-transitory computer-readable medium of claim 31, wherein generating the testing report comprises:
determining, based on the diagnostic data, a monitored performance of the vehicle networking system during the testing mode;
comparing the monitored performance of the vehicle networking system during the testing mode to an expected performance of the vehicle networking system during the testing mode, yielding a comparison; and
determining, based on the comparison, a variance between the monitored performance and the expected performance, the testing report including data describing the variance.

37. The non-transitory computer-readable medium of claim 31, the operations further comprising:
after completion of the testing mode, causing the set of packet injectors to execute a subsequent testing mode in which a first packet injector and a second packet injector transmit a second synchronized sequence of data packets within the vehicle networking system, the second synchronized sequence of data packets being different than the synchronized sequence of data packets.

38. The non-transitory computer-readable medium of claim 31, wherein the diagnostic data is gathered through an OAM channel or through a designated data port.

39. The non-transitory computer-readable medium of claim 31, the operations further comprising:
synchronizing, using a timing a protocol, a first internal clock available to a first packet injector in the set of packet injectors and a second internal clock available to a second packet injector in the set of packet injectors.

40. The non-transitory computer-readable medium of claim 31, the operations further comprising:
determining, based on the testing report, a characterization of the vehicle networking system; and
determining an optimization of the vehicle networking system based on the characterization.

41. The non-transitory computer-readable medium of claim 31, the operations further comprising:
determining, based on the testing report, that a network function of the vehicle networking system that was tested by the testing mode is not performing as expected.

42. The non-transitory computer-readable medium of claim 31, the operations further comprising:
determining, based on the testing report, that there has been a malicious network intrusion of the vehicle networking system.

43. The non-transitory computer-readable medium of claim 31, the operations further comprising:
determining, based on the testing report, whether a desired Quality of Service level is being met.

44. The non-transitory computer-readable medium of claim 31, wherein the testing mode is performed in a hierarchical fashion on subsets of nodes in the vehicle networking system.

45. The non-transitory computer-readable medium of claim 44, wherein the hierarchical fashion in which the testing mode is performed extends from the vehicle networking system to a vehicle-to-vehicle networking system, vehicle-to-infrastructure networking system or vehicle-to-cloud networking system.

* * * * *